United States Patent [19]
Adamis

[11] 4,059,867
[45] Nov. 29, 1977

[54] HANDLE FOR UTENSILS

[76] Inventor: Robert J. Adamis, 3425 Monterey St., San Mateo, Calif. 94403

[21] Appl. No.: 719,372

[22] Filed: Sept. 1, 1976

[51] Int. Cl.$^2$ ............................................. A47B 95/02
[52] U.S. Cl. ..................................... 16/110 A; 16/125
[58] Field of Search ................. 16/119, 125, 110 R, 16/126, 110 A; 220/94 R

[56] References Cited

U.S. PATENT DOCUMENTS

| 494,386 | 3/1893 | Pritchard | 16/119 |
| 494,387 | 3/1893 | Pritchard | 16/119 |
| 609,527 | 8/1898 | Wilhelm | 16/119 |
| 686,841 | 11/1901 | Bertels | 16/126 UX |

FOREIGN PATENT DOCUMENTS 7,747  12/1905  United Kingdom .................. 16/119

Primary Examiner—Andrew V. Kundrat
Attorney, Agent, or Firm—George B. White

[57] ABSTRACT

The handle for utensils is of heat-insulating material preferably wood which is provided with an axial passage; at each end of the passage is a pocket having a radial cut-away portion extended through the periphery of the handle; a connector bar has a bent end extended through each pocket into the end of the axial passage; the other end of the bar extending at an angle to the handle is adapted to be fixedly secured or welded to a side of the utensil; the pockets prevent rotation of the handle.

1 Claim, 5 Drawing Figures

U.S. Patent
Nov. 29, 1977
4,059,867
FIG. 1.
FIG. 2.
FIG. 3.
FIG. 4.
FIG. 5.
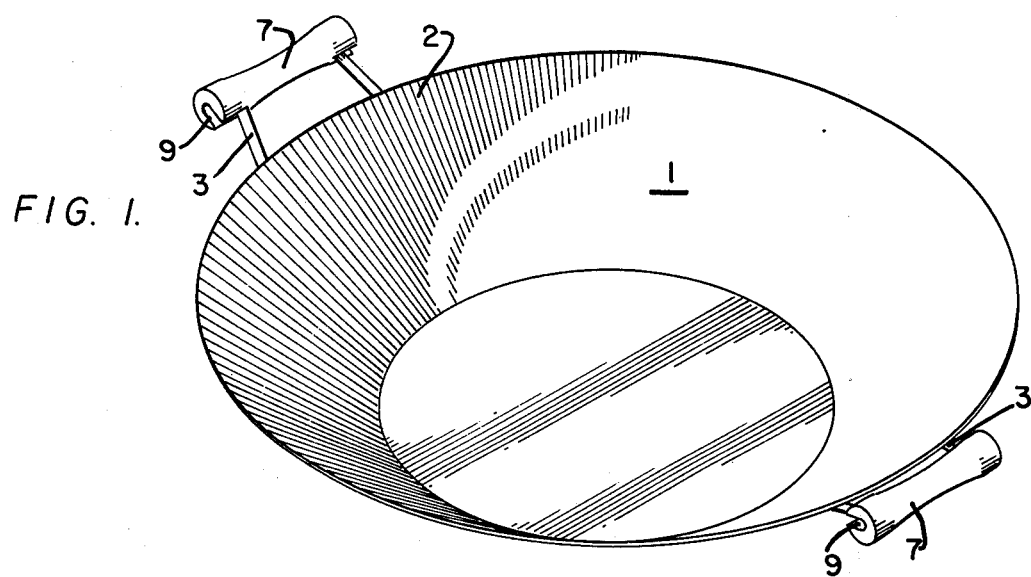
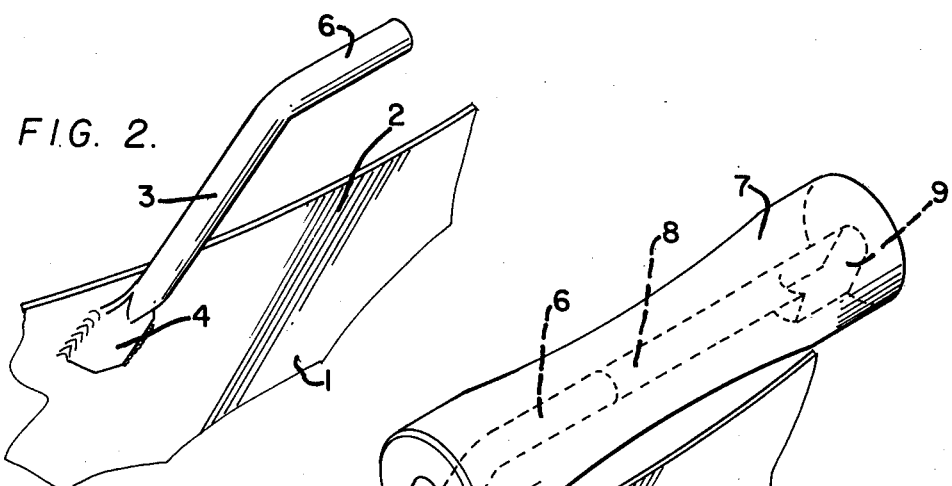
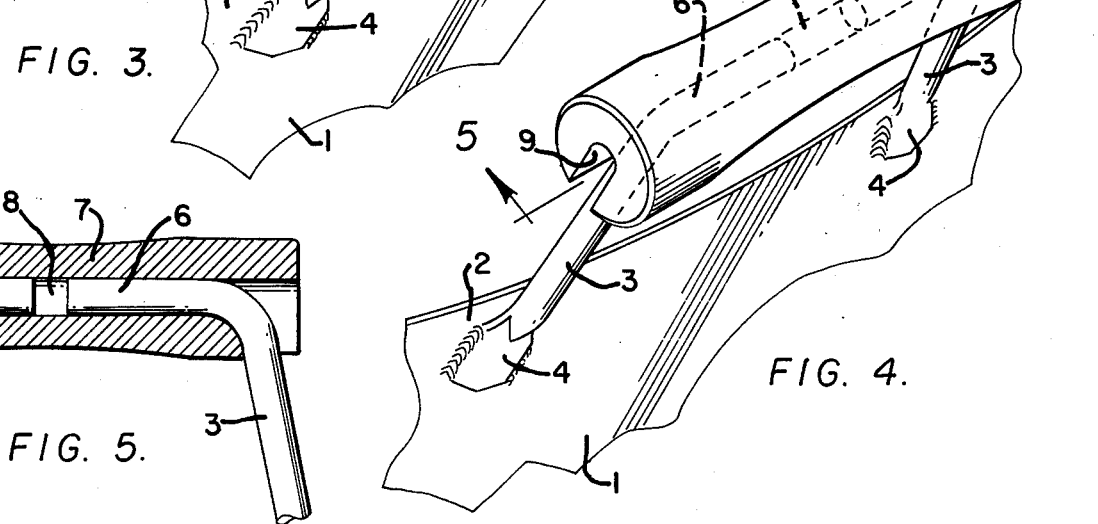
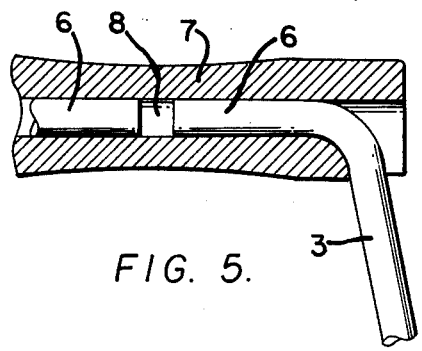

HANDLE FOR UTENSILS

SUMMARY OF THE INVENTION

It is very difficult to fixedly attach an insulating handle to a utensil such as a wok or a pan, so as to provide a facile and easy assembly and at the same time complete insulation.

The primary object of the invention is to provide an insulator handle in which the conductive elements can be easily placed in position and after the same are fixedly secured to the rim of the pan then the handle is held non-rotatably spaced from the periphery of the pan to a distance preventing the burning of the hands yet prevent rotation.

BRIEF DESCRIPTION OF THE DRAWINGS

FIG. 1 is a perspective view of a pan with the opposite handles attached to the rim of the same.

FIG. 2 is a fragmental detail view showing one of the connecting bars welded to the rim.

FIG. 3 is a fragmental view showing the insulating handle on the welded bar.

FIG. 4 shows the second inserted handle welded in the bar to hold the handle in a rigid position.

FIG. 5 is a fragmental sectional view taken substantially on the lines 5—5 of FIG. 4.

DETAILED DESCRIPTION

The pan 1 has a rim 2. A rigid connector bar 3 has one end 4 welded to the underside of the pan adjacent to rim 2. The free end of each connecting bar is bent to form a handle holder 6 substantially parallel with the rim 2. There are two such connecting bars 3, the bent ends of which are extended into the opposite ends of an insulator handle 7 in this illustration made of wood.

The handle 7 is substantially cylindrical tapering inwardly toward the middle to provide a convenient grip. An axial passage extends entirely through the handle 7. At each end on the passage 8 is a radial pocket 9 formed by cutting away from the end of the passage 8 to the outer periphery of the handle 7. The pocket 9 is sufficiently deep axially inwardly of the handle 7 to entirely conceal the connecting bar 3 thereby to prevent contact with hot metal while the handle 7 is gripped.

In operation one of the connector bars 3 is welded to the periphery of the pan 1, and the handle is placed thereover as shown in FIG. 3. Then the other handle bar 3 is inserted in the other end of the handle 7 and the end 4 of the bar 3 is welded to the pan as shown in FIG. 4. The securing of the bars may be also performed by placing the bent spacer ends 6 of both connector bars 3 in the opposite ends of the passage 8 of the handle 7 so that the connecting bars 3 are concealed within the respective pockets 9, then welding the ends 4 to the underside of the pan 1 adjacent the rim 2 thereof. The result of this construction is that it renders it impossible for the wooden handle to rotate.

I claim

1. In combination,
   a pan,
   a rim on said pan,
   a handle grip having an axial passage therethrough and having an outer periphery defined by a cylindrical portion at each end joined by a concave intermediate portion,
   a radial pocket at each end of the passage extending toward said pan through said cylindrical portions,
   a rigid connecting bar at each end of the handle grip,
   a bent end of each bar extending from said pocket axially into said passage and a radial portion of the bar being restrained in said pocket axially inwardly of the end of said handle for preventing rotation of said handle grip and exposure of the bent ends,
   the other end of each bar being flattened in a plane containing said radial portions and welded to said pan adjacent said rim.

* * * * *

Disclaimer 4,059,867.—*Robert J. Adamis,* San Mateo, Calif. HANDLE FOR UTENSILS. Patent dated Nov. 29, 1977. Disclaimer filed May 4, 1981, by the inventor.

Hereby enters this disclaimer to claim 1 of said patent.

[*Official Gazette July 14, 1981.*]